(12) United States Patent
Cooper

(10) Patent No.: US 7,099,388 B2
(45) Date of Patent: Aug. 29, 2006

(54) SYSTEM AND METHOD FOR ENABLING COMPATIBILITY BETWEEN DIGITAL AND ANALOG TELEVISION SYSTEMS

(76) Inventor: J. Carl Cooper, 15288 Via Pinto, Monte Sereno, CA (US) 95030

( * ) Notice: Subject to any disclaimer, the term of this patent is extended or adjusted under 35 U.S.C. 154(b) by 450 days.

(21) Appl. No.: 09/927,743

(22) Filed: Aug. 10, 2001

(65) Prior Publication Data

US 2002/0024998 A1    Feb. 28, 2002

Related U.S. Application Data

(60) Provisional application No. 60/228,270, filed on Aug. 25, 2000.

(51) Int. Cl.
*H04N 7/12*     (2006.01)
*H04N 7/01*     (2006.01)
(52) U.S. Cl. .................... 375/240.01; 348/445
(58) Field of Classification Search .......... 375/240.01, 375/240.28; 348/569, 441, 458, 723, 445
See application file for complete search history.

(56) References Cited

U.S. PATENT DOCUMENTS 4,870,489 A * 9/1989 Ducret ..................... 348/458
4,953,025 A * 8/1990 Saitoh et al. ............... 348/445
5,774,193 A * 6/1998 Vaughan .................... 348/723
6,020,927 A * 2/2000 Tanaka et al. ............. 348/458
6,611,293 B1* 8/2003 Tarnoff et al. ............. 348/441
6,710,817 B1* 3/2004 Oku et al. .................. 348/569

OTHER PUBLICATIONS

"HDTV's future out of focus" Jul. 31, 1998 Steward Jennison http://www.messenger-inquirer.com/vision2008/e22370.htm.
"RCA DTC-100 Satellite REceiver and HDTV to Analog Converter Now Available!!" http://store.yahoo.com/dss4u/rcadrslavrec.html.

* cited by examiner

*Primary Examiner*—Gims Philippe

(57)       ABSTRACT

The invention converts a digital HDTV or SDTV video and/or audio signal(s) into an analog signal which is compatible with existing analog systems. The compatible analog signal carries the digital video and/or audio in a quasi digital form which provides immunity to analog noise and distortion. Digital video and audio are compressed to provide digital compressed signals that are coupled to a digital to analog formatter where they are formatted into an NTSC, PAL, or SECAM compatible analog signal. The active video portion of the signal uses a multilevel pulse amplitude coded signal to carry the digital compressed signal. The converted analog signal can then be stored or transmitted using existing NTSC, PAL, or SECAM standards and equipment.

26 Claims, 7 Drawing Sheets

SYSTEM AND METHOD FOR ENABLING COMPATIBILITY BETWEEN DIGITAL AND ANALOG TELEVISION SYSTEMS

CROSS-REFERENCE TO RELATED APPLICATION

This application is a non-provisional application claiming the benefits of provisional application No. 60/228,270 filed Aug. 25, 2000.

FIELD OF THE INVENTION

This invention relates generally to television systems, for example of the type utilized in producing and broadcasting entertainment programs to the general public in accordance with existing NTSC, PAL, SECAM and High Definition standards. In particular the present invention provides for an interface between newer digital television audio and video signals and existing older analog television systems and equipment so as to allow utilization of the existing installed base of analog equipment such as video recorders, routers, switchers and the like with new digital and HDTV (High Definition TV) video programs. While shown in respect to television signals, it will be recognized that the invention is generally applicable for carrying digital information as an analog signal which adheres to or approximates some standard such as those standards which are published by various agencies such as ANSI, IEEE, etc.

BACKGROUND OF THE INVENTION

Devices such as the RCA DTC-100 allow for a HDTV broadcast to be viewed on an analog TV set. This is what is commonly known as a down converter which looses much of the HDTV signal detail when creating a NTSC signal. The present invention enables recording a SDTV (Standard Definition TV) or a HDTV (High Definition TV) digital signal, carried in compressed form, on a standard definition, analog (NTSC) video recorder, with the recording being essentially a digital recording. This is accomplished with no information thrown away and with a recording process, which is lossless.

Many articles (HDTV's Future Out of Focus, Jul. 31, 1998, Stewart Jennison of Messenger-Inquirer) discuss conversion of HDTV signal to an analog signal.

Integrated circuits or chips on the market today perform various functions with analog and digital SDTV and HDTV signals such as converting analog SDTV and HDTV signals to digital and vice versa. Other ICs perform MPEG compression and decompression of digital HDTV and SDTV signals. Still other Ics perform conversion and compression of audio signals. As one example, the Philips device SAA7114H provides for decoding of an analog PAL/NTSC/SECAM video signal to supply a digital component (Y, R-Y, B-Y) version of the input signal This IC and many others which are capable of such processing can be found on the internet web site for the respective companies. As another example, Texas Instrument chips THS8133 and THS8134 provide for digital to analog conversion of a digital HDTV signal. These and other similar chips provide a useful function for converting analog video to digital while other chips in the same product lines convert digital video to analog, which can be found in the discussion of the present invention. Motorola Super-Chip DSP56366 is a generalized digital signal processing IC which is capable of compression and decompression of digital audio signals. Program ROMs are available for several audio functions, for example decompression of MPEG or Dolby compressed audio signals. This chip provides a useful function for audio decompression, which can be found in the discussion of the present invention. C-Cube chip CLM4700 performs digital video encoding of MPEG digital video signals and, as such, can be useful for video compression as an element of the present invention. C-Cube also has available companion chips which perform decompression of compressed video signals.

It is known to convert CCIR 601 type digital video signal and AES/EBU audio signals to NTSC/PAL/SECAM analog audio and video for recording on existing analog video tape machines, with the subsequent conversion of the played back analog signals to digital Such systems are sold to enable the use of existing analog recording machines in CCIR 601 digital systems, thereby eliminating the need to replace the existing analog recording machines with new digital recording machines. The recorded signal is however an analog video signal and is subject to typical analog recording degradation such as added distortion and noise. This process of converting a digital signal to analog whereby the analog version is recorded is unlike the present invention which as will be explained in more detail uses a standard analog recorder to record a video and audio signals in digital form. The prior art system of converting to analog for recording works reasonably well because a CCIR 601 digital video signal contains only the same amount of information (i.e. image detail) as a standard analog NTSC/PAL/SECAM video signal. Thus CCIR 601 signals may be converted to analog and back with little loss of image detail, but with each conversion adding noise and distortion. Thought of in another way, the bandwidth of the analog signal necessary to carry an analog version of a CCIR 601 digital signal is compatible with analog NTSC/PAL/SECAM bandwidth standards In addition, while CCIR 601 allows for several audio channels, typically only two are used, which is compatible with the two analog audio channels which are typically provided in analog systems.

Unfortunately, the amount of image detail contained in any of the standard HDTV signal is far in excess of that of a CCIR 601 digital signal, and when such HDTV signals are converted to analog the resulting analog signal bandwidth is far in excess of that which is compatible with NTSC/PAL/SECAM standards and equipment. Consequently the aforementioned system of converting to analog and back to allow existing analog equipment to be used with HDTV signals will not work without a severe loss of image detail. Further, most HDTV audio signals are typically 4 or more channels with existing analog equipment typically providing capability for only two analog channels. Consequently, HDTV audio channels in excess of that provided in the existing analog equipment cannot be accommodated.

SUMMARY OF THE INVENTION

The main aspect of the present invention is to provide for utilization of existing analog video storage equipment (such as analog recorders) and other equipment (such as transmission equipment) for the purpose of storage and/or transmission of HDTV or SDTV digital video and/or audio signals in digital form.

Another aspect of the present invention is to provide a means of compression of digital video and audio signals and formatting said signals into a form which appears to standard analog equipment to be an existing video and audio analog standard format such as NTSC, PAL, SECAM, etc.

Another aspect of the present invention, an alternate embodiment, is to provide a means of taking stored or transmitted analog compatible compressed and combined video/audio signals, formatting them into separately compressed digital video/audio signals and decompressing such signals into standard SDTV or HDTV digital format.

Another aspect of the present invention is to provide a means of separately compressing video/audio digital signals, combining the compressed video/audio digital signals and formatting the combined signals to a standard analog format such as NTSC, PAL or SECAM.

Another aspect of the present invention, an alternate embodiment, is to provide for a means for taking a digital video and a digital audio signal through a combined MPEG compression, formatting the MPEG compressed signal through a digital to analog formatter resulting in a signal which appears to standard analog equipment to be a standard analog format such as NTSC, PAL or SECAM.

Another aspect of the present invention, an alternate embodiment, is to provide a means of taking a digital video and a digital audio signal through a combined MPEG compression and formatting the MPEG compressed signal to a uncompressed compatible CCIR 601 analog signal.

Other aspects of this invention will appear from the following description and appended claims, reference being made to the accompanying drawings forming a part of this specification wherein like reference characters designate corresponding parts in the several views.

The invention described herein provides for converting a digital HDTV video and/or audio signal(s) into a compatible analog signal which has a form which is compatible with existing analog systems and equipment, especially those of NTSC, PAL, SECAM, and similar types. Although the digital signal is carried in analog form, the analog form still maintains the video and/or audio in a quasi digital fashion such that it is immune to the distortion and noise which would otherwise typically degrade the analog form. The inventor herein defines the term quasidigital to mean an analog signal which carries digital information in a fashion such that the signal amplitude is restricted to discrete values at specific times. In addition the invention provides for conversion of the compatible analog signal back to digital HDTV video and/or audio signal(s). The system allows existing analog television systems and equipment such as NTSC, PAL, and SECAM standard systems and the like to be utilized to operate with new HDTV signals. Additionally, an embodiment of the invention is described which is useful for allowing a digital HDTV video and/or audio signal(s) to be utilized with existing digital CCIR 601 type systems and equipment. The teachings of the present invention will allow one of ordinary skill in the art to make numerous other utilizations of digital and analog audio and video technology and techniques to improve the signal handling characteristics over that which is now known, and in particular to greatly increase the ability of such technology and techniques to operate with digital audio and/or video signals with improved detail and noise characteristics.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

It will be noted that the diagrams of the Figures, and in particular FIGS. 1–4 and 7 are given in simplified form and for purposes of clarity omit many elements and connections which are necessary to the proper operation of the invention as described. Such elements and connections will be known to one of ordinary skill in the art from the teachings herein. It will be known to one of ordinary skill in the art from the teachings herein that those chips by manufacturers described above, as well as similar chips manufactured by other manufactures may be combined and operated to perform and implement the present inventive features without resorting to undue experimentation or further invention. By way of example, each block (3, 4, 7, 9, 10, 11, 12, 14, 19 for example) will be known to contain detailed circuit elements which are not shown, and interconnections both within and between each block which also are not shown, the proper construction of which will be well within the capability of one of ordinary skill in the art without undue experimentation, given the teachings herein.

Figure 1:
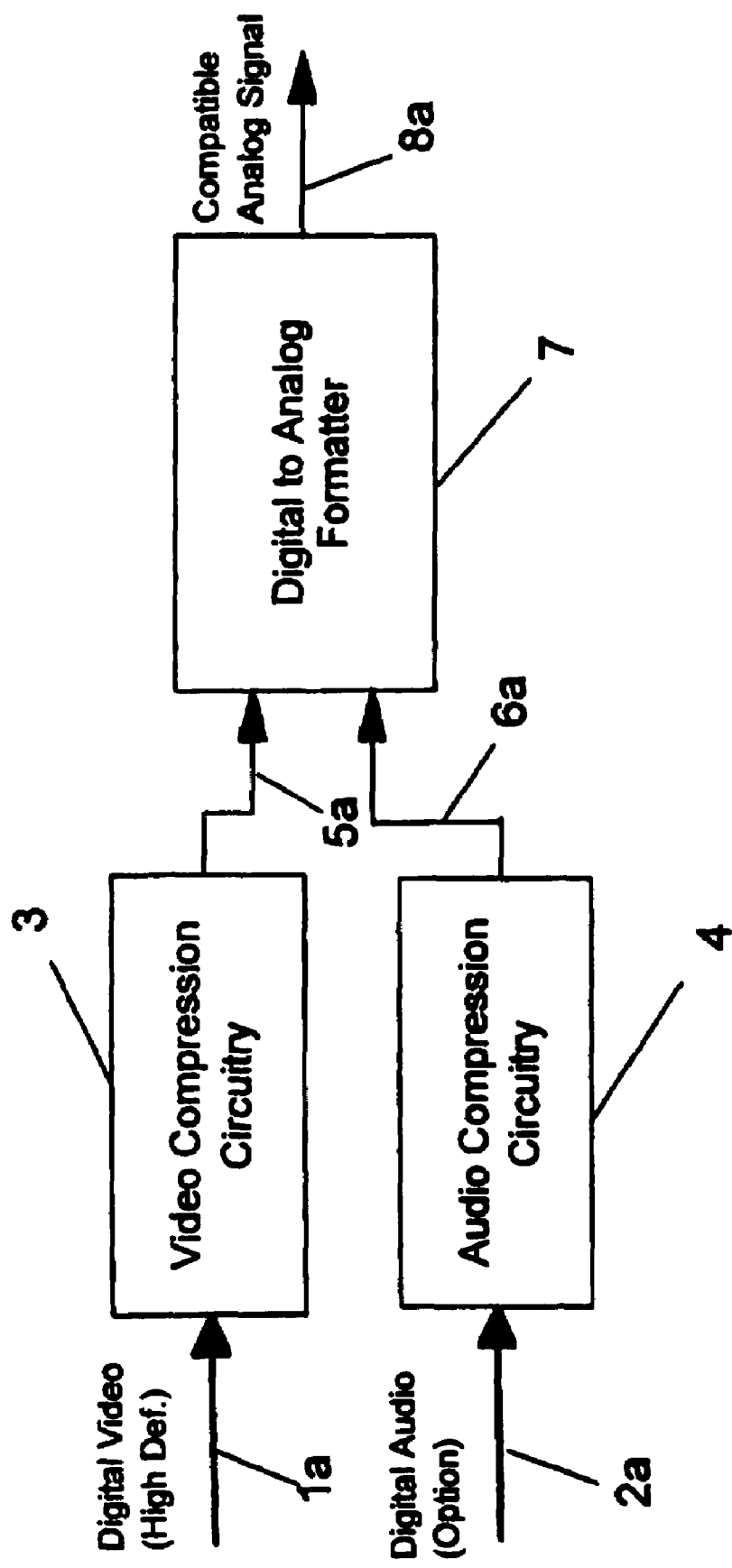
FIG. 1 shows the preferred encoding embodiment of the invention.

FIG. 1 shows the encoder of the preferred embodiment of the present invention wherein a digital video signal 1a and optionally a digital audio signal 2a are converted to a compatible analog signal 8a, which is compatible with existing analog systems and equipment. By way of example, with respect to the preferred embodiment, the invention will be described with respect to converting HDTV digital video and digital audio television programs for use with NTSC analog equipment, and back. It will be understood however that one of ordinary skill in the art will know from the teachings herein to utilize the invention with other types of digital and analog signals and systems.

HDTV video 1a is received and coupled to a video compression circuit 3 where it is compressed to provide a compressed video signal 5a. Optionally, a multiple channel digital audio signal 2a associated with the HDTV video signal 1a is received and coupled to an audio compression circuit 4 to provide a compressed audio signal 6a. The compressed video signal 5a and, if utilized, the compressed audio signal(s) 6a are coupled to a digital-to-analog formatter 7 where they are formatted into a compatible analog signal 8a. Each of the compressed video signal 5a and compressed audio signal(s) 6a are converted to multilevel analog signals which are combined and added to standard sync and blanking waveforms to create a compatible analog signal 8a. In the preferred embodiment separate analog waveforms are preferred to be utilized for each of the video and audio signals 5a, 6a, however one waveform may be utilized for both if desired. The combination of waveforms may be by any method which will become known to one of ordinary skill in the art from the teachings herein.

The compatible analog signal 8*a* is preferred to appear as a standard analog video signal, in as much as the makeup of the compatible analog signal 8*a* is desired to utilize standard analog sync and burst while it is also preferred to convert the digital signals 5*a*, 6*a* into a multilevel analog waveform and placed into the active video portion of a standard analog signal format in a fashion such that the digital signals 5*a*, 6*a* are passed and operated on by standard analog signal equipment without imparting adverse distortion, artifacts and the like to the waveform, thus allowing subsequent recovery of digital signals 5*a*, 6*a* as will be described further below.

Figure 2:
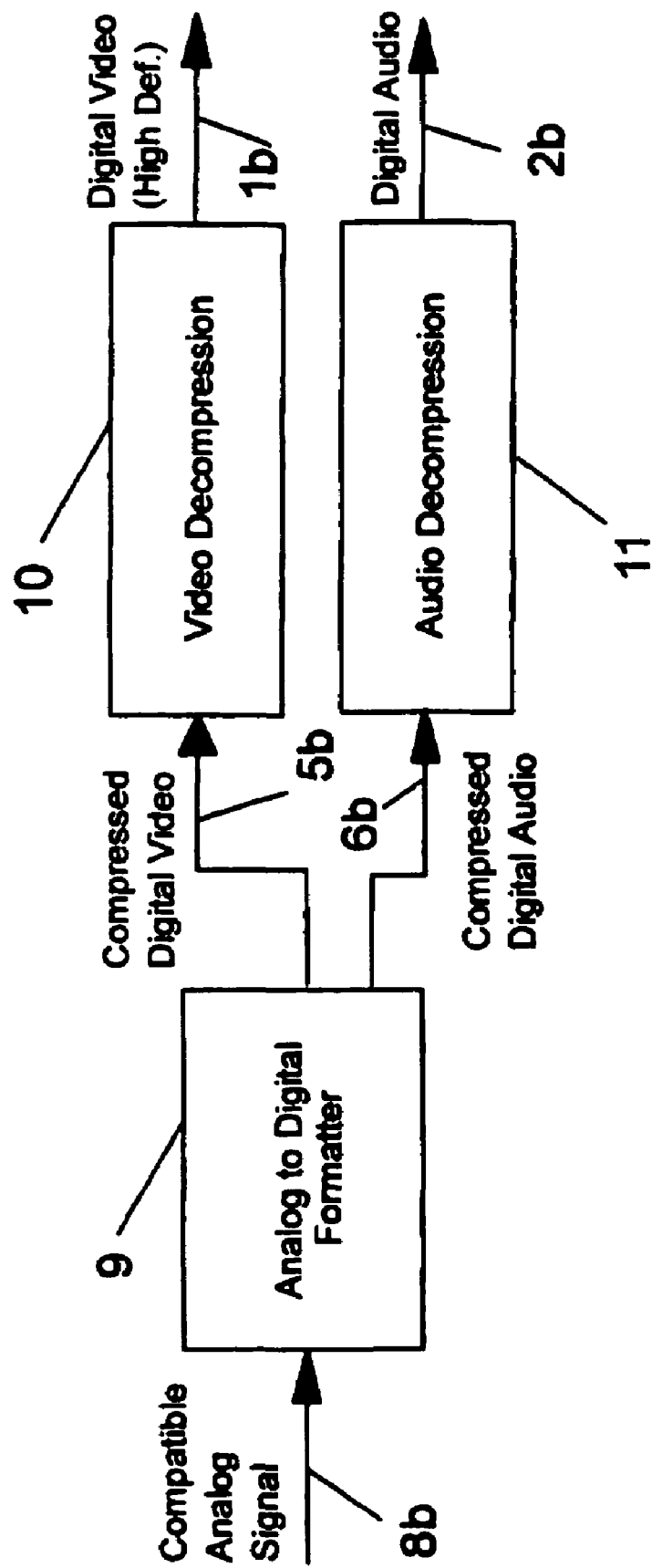
FIG. 2 shows the preferred decoding embodiment of the invention.

FIG. 2 shows the decoder of the preferred embodiment of the present invention wherein a digital video signal 5*b* and optionally a digital audio 6*b* signal are recovered from a compatible analog signal 8*b*, which is compatible with existing analog systems and equipment. The decoder receives and couples compatible analog signal 8*b* to an analog-to-digital deformatter 9 which operates on the compatible analog signal 8*b* to provide compressed digital video signal 5*b* and if present compressed digital audio signal(s) 6*b*, which signals 5*b*, 6*b* are equivalent to the encoded versions 5*a*, 6*a* previously discussed It will be noted that the digital video signal 5*b* and the digital audio signal 6*b* may not be identical to compressed digital signals 5*a*, 6*a* previously discussed as a result of distortion, artifacts and the like which have been imparted to the waveform of the compatible analog signal 8*a* by analog equipment. Such differences may be simply considered to be digital errors for understanding of the operation of the preferred embodiment of the present invention.

The recovered compressed digital video signal 5*b* and the digital audio signal(s) 6*b* are coupled to a video decompression circuit 10 and audio decompression circuit 11 respectively, with each decompression circuit operating on its respective input signal to provide a digital video signal 1*b* and a digital audio signal(s) 2*b*, which are equivalent to the original digital signals 1*a*, 2*a*. It will again be noted that digital video signal 1*b* and digital audio signal(s) 2*b* may not be identical to the original digital signals 1*a*, 2*a* as a result of distortion, artifacts and the like which have been imparted to the waveform of the compatible analog signal 8*a* by analog equipment. Such differences may be simply considered to be digital errors for understanding of the operation of the preferred embodiment.

The above mentioned digital errors which result from distortion, artifacts and the like which have been imparted to the waveform of the compatible analog signal 8*a* (FIG. 1) may be acceptable in many circumstances and especially when it is understood that the audio and video compression techniques used 3, 4 (FIG. 1) and the corresponding compression used 10, 11 (FIG. 2) are preferred to include protection against errors which occur in the compressed data stream, for example, by the use of error detection and correction techniques.

One of ordinary skill in the art will be able to construct and utilize the various elements of, and practice the invention, without undue experimentation from the description of the invention given herein. In particular video and audio compression and decompression systems are well known in the art and may be utilized for elements previously discussed (FIGS. 1 3, 4, and FIGS. 2 10, 11). The digital to analog formatter 7 (FIG. 1) and complimentary deformatter 9 (FIG. 2) may be constructed using utilizing known systems for encoding digital audio signals on analog video signals. Such systems convert digital bits of an audio signal to a multilevel analog video signal and can be easily modified by one of ordinary skill in the art to convert digital bits of compressed video and audio signals to a multilevel analog video signal. Such system is used for example in the Viewguard security system manufactured by Leitch, Inc. of Toronto, Canada.

Figure 3:
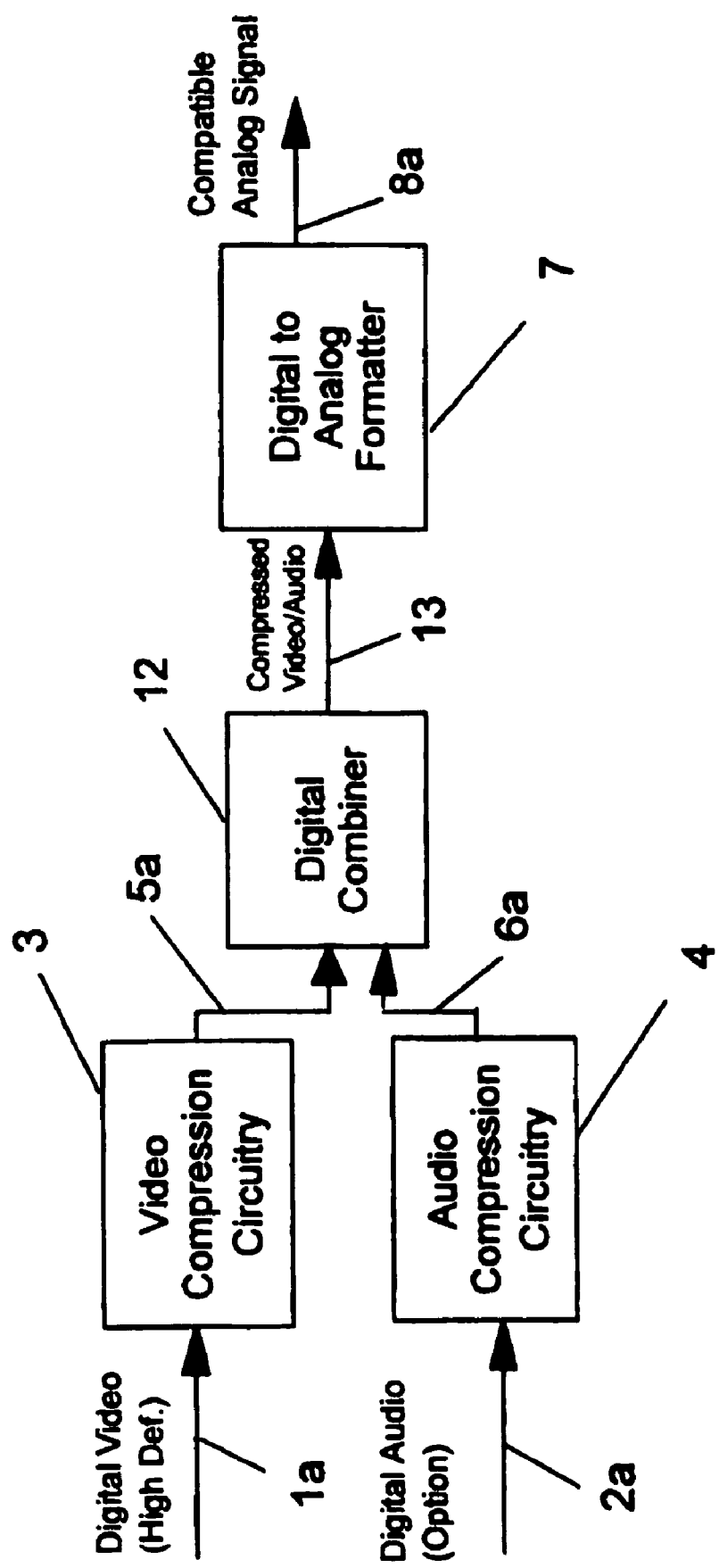
FIG. 3 shows a second encoding, an alternate embodiment of the invention

FIG. 3 shows an alternate encoder embodiment of the invention. A digital video signal 1*a* is received and coupled to a video compression circuitry 3 where it is compressed to provide a compressed video signal 5*a*. Optionally, a multiple channel digital audio signal 2*a* associated with the HDTV video signal 1*a* is received and coupled to an audio compression circuitry 4 to provide a compressed audio signal 6*a*. The video compression circuitry 3 and the audio compression circuitry 4 being the same as described with respect to FIG. 1. The compressed video signal 5*a* and, if utilized, the compressed audio signal 6*a* are coupled to a digital combiner 12 which operates to provide a digital combined compressed audio and video signal 13 which is coupled to digital to analog formatter 7, corresponding in function to the digital to analog formatter 7 of FIG. 1. In this fashion the combined compressed digital signal 13 is converted to a suitable analog waveform and combined with standard sync and blanking waveforms to provide compatible analog signal 8*a*. It may be noted that while the preferred embodiment of the invention utilizes a single compatible analog signal 8*a*, there may be applications for the invention where multiple signals would be desirable. As one example, rather than the compatible analog signal 8*a* being compatible with NTSC standards, it may be desired to have three signals compatible with RGB signal standards or some other multiple signal standard. As another example, separate video and audio compatible analog signals may be utilized. The use of such multiple signals will be within the capability of one of ordinary skill in the art from the teachings herein. It is intended to be understood that while the phrase compatible analog signal is singular, it is to be construed as encompassing such multiple signal embodiments, both in the description of the invention given in respect to the various figures, and the invention as claimed.

The preferred embodiment of the invention is shown utilizing standard sync, burst and blanking for NTSC, PAL or SECAM video signals, however it will be understood that the signal may very well use nonstandard but similar synchronizing information. For example, color burst may be eliminated, and sync and blanking widths or amplitudes may be altered to suit particular applications as will be understood by one of ordinary skill in the art from the teachings herein. Similar departures from the precise standards may be had in respect to other types of standard analog signals.

While not shown by separate figure, it will be recognized that a suitable decoder for use with the encoder of FIG. 3 may be suitably constructed.

Figure 4:
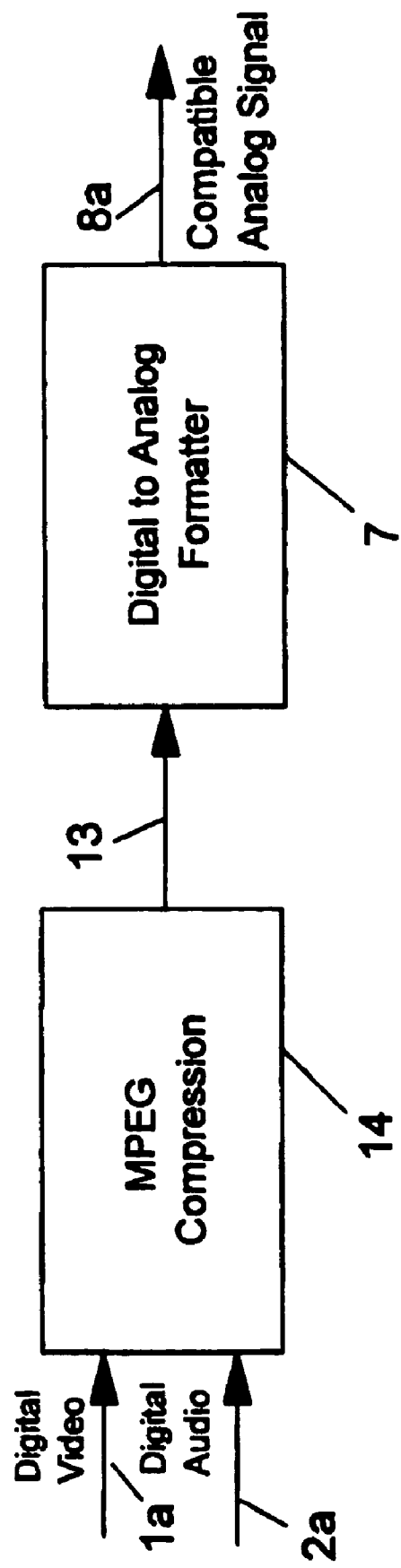
FIG. 4 shows a first MPEG encoding embodiment of the invention.

FIG. 4 shows another alternate embodiment of the invention which utilizes a combination audio and video compression system 14. Video 1*a* and audio 2*a* are coupled to combination compression system 14. Compression 14 is preferred to be an MPEG compression system, and specifically MPEG 2 as specified for the US digital television transmission standard, however other types and styles of compression may be utilized as well. The combination audio and video compressed signal 13, which is provided by 14, is coupled to digital to analog formatter 7 which in turn provides a compatible analog signal 8*a* as previously discussed.

While not shown by separate figure, it will be recognized that a suitable decoder for use with the encoder of FIG. 4 may be suitable constructed.

Figure 5:
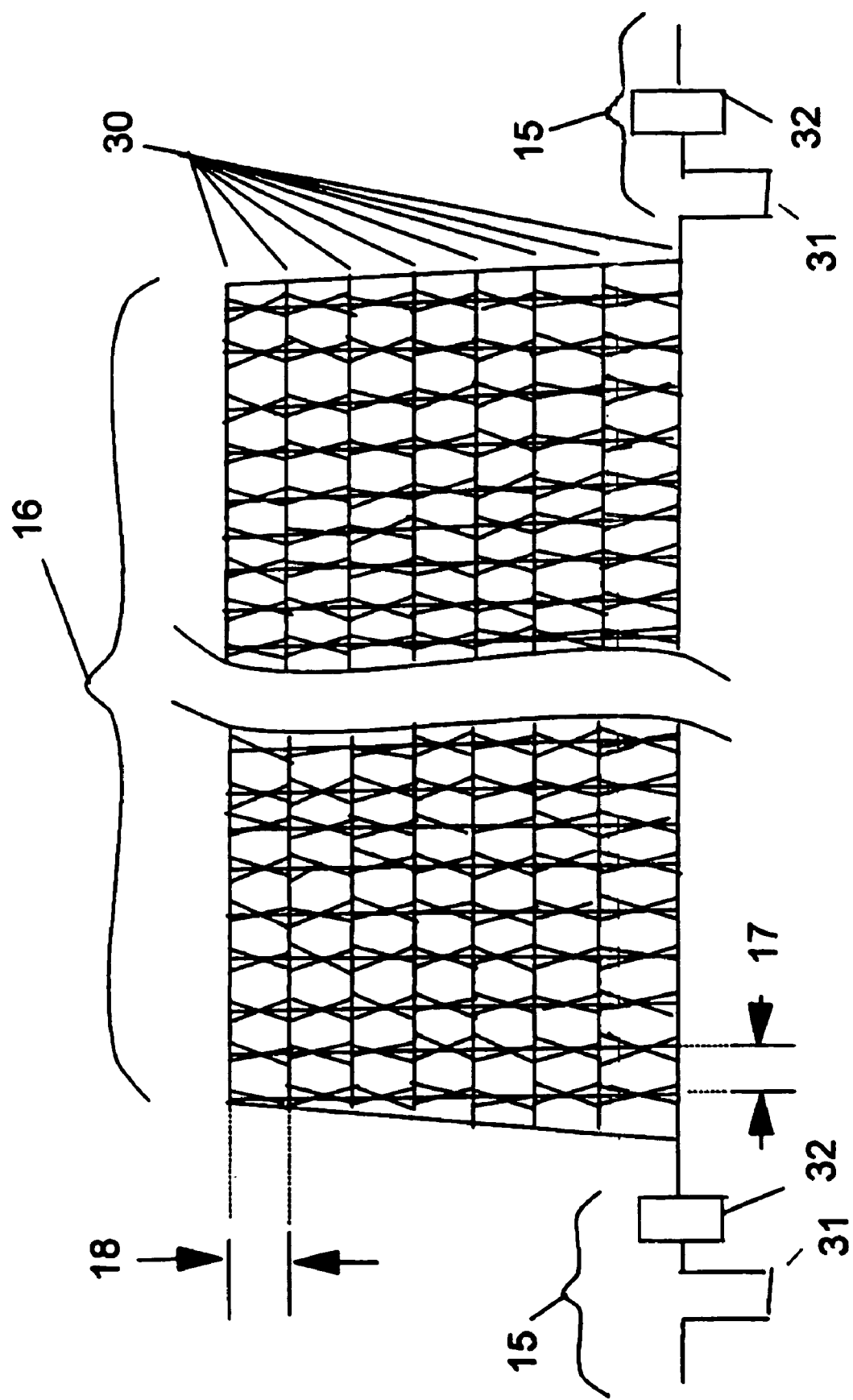
FIG. 5 shows a first waveform example of the compatible analog signal of the invention.

FIG. 5 shows a representative NTSC waveform 16 of the preferred embodiment of the present invention in the form. The NTSC waveform 16 is that of the compatible analog signal (8a of FIG. 1). The NTSC waveform 16 is of a repetitive horizontal sweep type commonly utilized in the industry in respect to common waveform monitors. The waveform 16 may be thought of as many individual horizontal line waveforms which are overlaid in a time sequential fashion such that all possible variations of the waveform 16 are shown. Also shown is a standard NTSC horizontal blanking interval 15 having standard horizontal sync 31 and color burst 32. It is not shown, but will be understood that the vertical blanking interval, and all amplitudes, pulse intervals, durations, etc. which relate to the waveform are intended to conform to NTSC standards.

In the active video section of the waveform 16 is shown in an eight multilevel 30 pulse amplitude waveform which carries the digital data of the compressed video signal 5a (FIG. 1) and the compressed audio signal(s) 6a (FIG. 1) or the combined compressed video/audio signal 13 (FIG. 3) or the compressed MPEG signal 13 (FIG. 4). The pulse amplitude waveform 16 has eight discrete amplitudes of voltage levels 30 having a uniform amplitude separation 18. The pulse amplitude waveform 16 also has multiple discrete durations in time, having uniform separation of cell time durations 17. While it is preferred that the amplitude levels and time durations be uniform, it will be understood that there will be applications for the invention where non-uniform levels and/or durations may be preferred.

The signal 16 is one form of quasidigital signal which may be utilized for the present invention, and from the teachings herein one of ordinary skill in the art will recognize that there are other forms of quasidigital signals which may be utilized to practice the invention. It should be noted that quasidigital signal generally has characteristics which allow the digital information which it represents to be recovered without error (or at least with mostly correctable errors) after expected amounts of noise and distortion are introduced. For example in the preferred embodiment the uniform amplitude separations 18 in conjunction with the discrete time intervals 17 form an eye pattern as is well known in digital transmission technology. As is well known, the signal is relatively immune to noise and distortion as long as the noise and distortion do not cause the eye opening to close. As long as the eye does not close, the original level of the signal may be reliably determined, that is, even with noise added as long as the noise does not cause the signal to divert to a different level it remains near the original level. The present invention thus takes advantage of the quasidigital form of the data carrying signal, combined with standard synchronizing pulses 31 and burst 32 of typical analog video signals, to achieve digital recording (or other processing) utilizing standard analog equipment One of ordinary skill will realize from the present teachings to combine quasidigital forms with other types of standard synchronizing type signals to create other types of standard analog signals useful in other types of analog systems.

While eight discrete amplitude levels 30 are shown, it will be recognized that different numbers may be utilized depending primarily on the expected quality of the analog equipment, which will pass or operate on the compatible analog signal 8a (FIG. 1). The number of levels may be generally increased for higher quality equipment, and decreased for lower quality systems. It is important that there be sufficient amplitude separation 18 between levels such that noise, distortion and the like which are imparted to the waveform 16 by the analog equipment and do not cause a blurring of the discrete amplitude levels 30. Additionally, the amount of cell time duration 17, and consequently the number of cells per video line may be similarly optimized to match the quality of the analog equipment which will pass or operate on the compatible analog signal 8a (FIG. 1). As the number of cells is increased, corresponding to shorter cell time durations 17, the frequency content of the signal increases. With higher quality equipment having capability of passing the full NTSC bandwidth, a larger number of cells may be utilized. With lower quality equipment which is not capable with passing the full NTSC bandwidth, a smaller number of cells must be accepted.

In general, the size of the cells which is dependent on the amplitude separation 18 and the cell time duration 17, composes an eye with the entirety of the active video area (pulse amplitude waveform 16) creating a type of eye pattern, corresponding to eye patterns which are well known in digital communications channel technology. It will be understood that the size of the eye is related to the number of errors which are made when the signal is operated on by the analog equipment, with larger eyes being more error free for a given quality of analog equipment. There will be a tradeoff between eye size, and errors, corresponding to a tradeoff between the amount of digital data which can be sent over a line of video and the number of errors which are generated. The higher the data number, corresponding to smaller eyes, the more errors will be generated.

Figure 6:
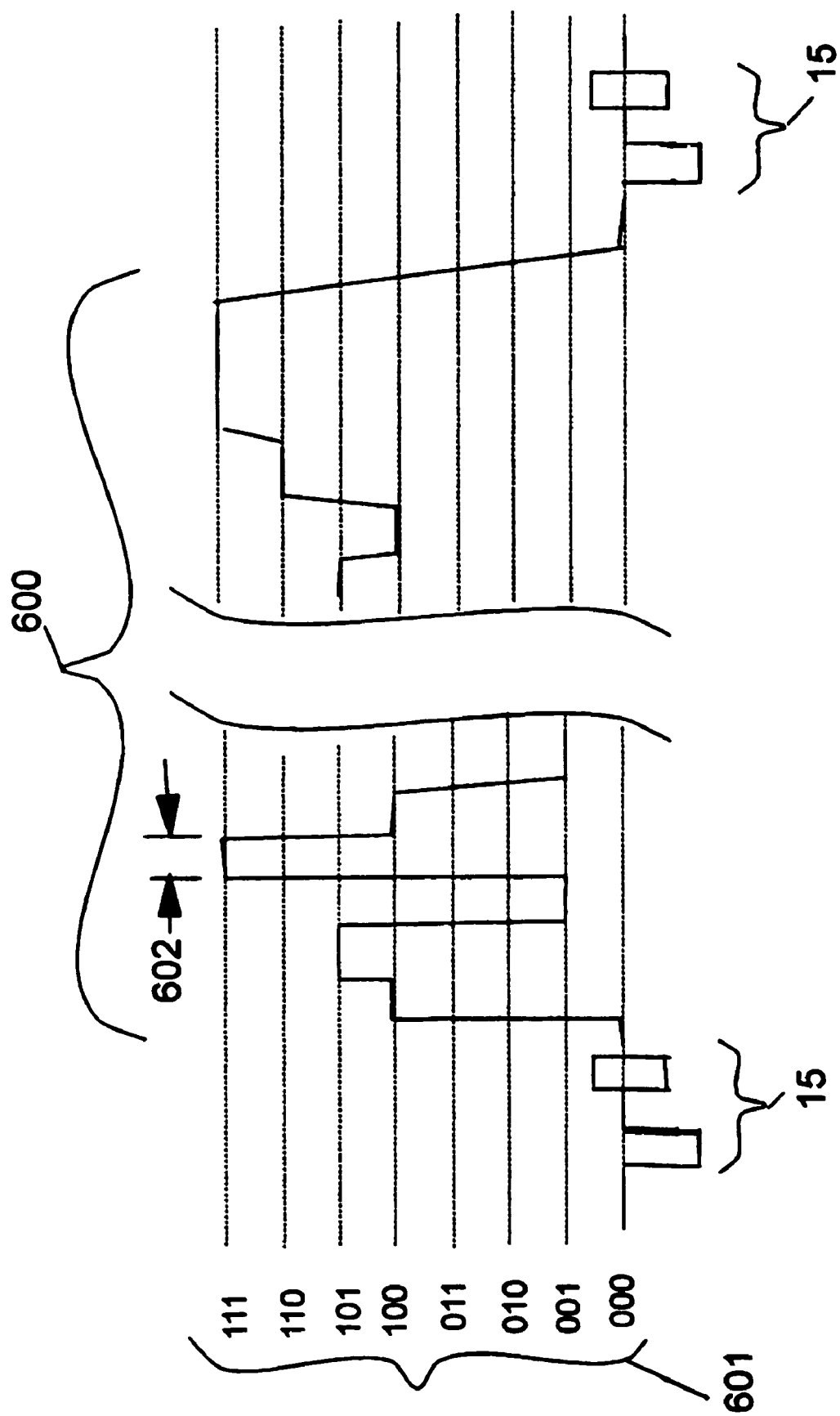
FIG. 6 shows a second waveform example of the compatible analog signal of the invention.

FIG. 6 shows a simplified example of a waveform 600 for a single line of data. The amplitude of the cells is shown such that there are eight levels 601, with each cell being approximately 250 nanoseconds long 602. The eight levels 601 have been labeled with their corresponding binary codes. Directly after the standard NTSC horizontal blanking interval 15, it can be seen that the data sequence is 100, 101, 001, 111, 100, 001, and so on. It is suggested for the preferred embodiment that 16 levels with a time duration of 125 nanoseconds is a good overall combination. This combination will provide a good tradeoff between data rate and error rate for typical broadcast system video components such as routers.

It should be noted that it is desirable for the rise and fall time of the cells to be shaped and limited to a rate of 16 cells amplitude per 62.5 nanoseconds to prevent undue ringing and consequently interference between cells. A circuit suitable for such shaping is described in detail in prior U.S. Pat. No. 4,816,830, which is incorporated herein by reference. Various types of coding schemes, which are well known in the art, may be utilized for generating the waveform used to fill the active video area of the waveform 600. In particular, those schemes which limit the transition distance from one cell to the next, and those in which the ringing from transitions occur only or near the transitions of the adjacent cells are of interest and desirable in that they maximize the data rate while minimizing the error rate.

Figure 7:
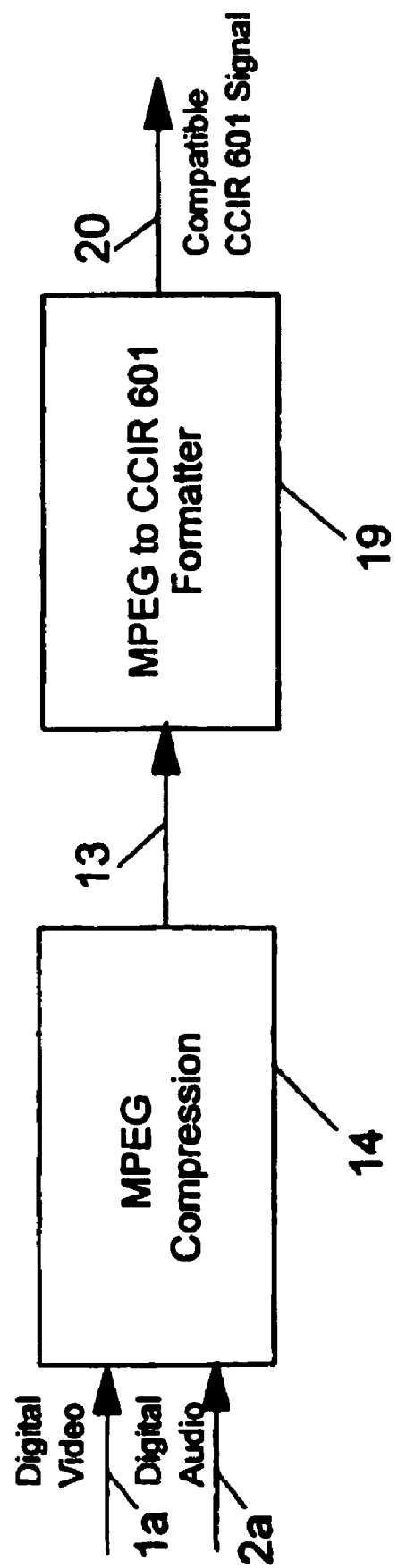
FIG. 7 shows a third encoding, an alternate embodiment of the invention.

FIG. 7 shows an additional alternate embodiment of the present invention wherein the compatible signal 20 is a CCIR 601 type digital signal rather that the analog signal previously described FIG. 7 shows digital video signal 1a and digital audio signal(s) 2a, which is received and coupled to MPEG compression 14 to provide a compressed video/audio signal 13 that is coupled to an MPEG to CCIR 601 formatter 19. The CCIR 601 formatter 19 outputs a signal, which looks like and is compatible with CCIR 601 standards allowing the HDTV digital video/audio signals 1a, 2a to be handled by standard 601 equipment. In this embodiment, MPEG to CCIR 601 formatter 19 makes use of known data compression techniques to further compress the MPEG compressed video/audio signal 13. Such compression techniques may include those commonly utilized in data transmission systems, such as various run length encoding and entropy encoding as are known in the art. The embodiment of FIG. 7 may be utilized to generate other types of digital signals as may be desirable to utilize the invention with other known existing systems.

It may be noted that while both encoder and decoder embodiments have been shown herein, each may be utilized without the other in particular applications. For example an encoder may be utilized by itself to provide a compatible analog signal to allow HDTV programs to be archived on existing analog archive systems, without the immediate need of a decoder.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A method of creating a compatible analog signal which carries a digital video signal on an existing analog video system including the steps of:
   a video compression step responsive to said digital video signal to provide a compressed video signal; and
   a digital to analog formatter step responsive to said compressed video signal and providing said compatible analog signal carrying said compressed video signal as a quasidigital signal, which compatible analog signal may be utilized by said analog video system.

2. A method of creating one of an NTSC or PAL or SECAM compatible analog signal which carries a digital HDTV video signal on an existing analog video system including the steps of:
   a video compression step responsive to said digital HDTV video signal to provide a compressed video signal; and
   a digital to analog formatter step responsive to said compressed video signal and providing said NTSC or PAL or SECAM compatible analog signal which includes a quasidigital signal which compatible analog signal may be utilized by said analog video system.

3. A method of creating one of an NTSC, or PAL or SECAM compatible analog signal which carries a digital HDTV program audio and video signal on an existing analog video system including the steps of:
   a video compression step responsive to said digital HDTV audio and video signals to provide a compressed audio and video signal; and
   a digital to analog formatter step responsive to said compressed audio and video signal and providing said NTSC or PAL or SECAM compatible analog signal that includes said compressed audio and video signal as a quasidigital signal, which compatible analog signal may be utilized by said analog video system.

4. A method of carrying digital information as an analog signal which includes synchronizing information according to a standard, said method including the steps of:
   compressing said digital information;
   encoding said compressed digital information as a quasidigital signal;
   selecting ones of said synchronizing information necessary for a signal to be compatible with said standard;
   combining said quasidigital signal and said selected ones of said synchronizing information to produce said analog signal.

5. The method as in claim 4 wherein said analog signal is a television video signal having horizontal and vertical synchronizing pulses.

6. The method as in claim 4 wherein said analog signal is a television video signal having horizontal and vertical synchronizing pulses and color burst.

7. The method as in claim 4 wherein said quasidigital signal carries digitized video.

8. The method as in claim 4 wherein said quasidigital signal carries digitized audio.

9. The method as in claim 4 wherein said quasidigital signal carries digitized audio and digitized video.

10. The method as in claim 4 wherein said quasidigital signal carries digitized video in MPEG form.

11. The method as in claim 4 wherein said quasidigital signal carries digitized audio in MPEG form.

12. The method as in claim 4 wherein said quasidigital signal carries digitized audio and digitized video in MPEG form.

13. The method as claimed in claim 1, 2 or 3 wherein said compatible analog signal includes horizontal sync pulses with the amplitude of said compatible analog signal being restricted to discrete values at specific times, each of which specific times is caused to occur at a known time after the preceding horizontal sync pulse.

14. The method as claimed in claim 1, 2 or 3 wherein said compatible analog signal is constrained to discrete amplitude values at specific times, and is further constrained such that the rise and fall times of transitions of said compatible analog signal between said discrete amplitude values is limited.

15. The method as claimed in claim 1, 2 or 3 wherein said compatible analog signal is constrained to discrete amplitude values at specific times, and is further constrained such that the rise and fall times of transitions of said compatible analog signal between said discrete amplitude values is shaped and limited.

16. A method of receiving a digital signal carried in analog form wherein the analog form is restricted to discrete values at specific times, including the steps of:
   a) identifying said specific times,
   b) identifying which of said discrete values said analog form is closest to at each of said specific times,
   c) in response to step b), providing the digital value corresponding to said identified discrete value,
   d) in response to each digital value of step c) providing said digital signal.

17. A method of receiving a digital signal which is compressed and carried in analog form wherein the analog form is restricted to discrete values at specific times, including the steps of:
   a) identifying said specific times,
   b) identifying which of said discrete values said analog form is closest to at each of said specific times,
   c) in response to step b), providing the digital value corresponding to said identified discrete value,
   d) in response to each digital value of step c) decompressing and providing said digital signal.

18. A method of receiving a digital signal carried in analog form wherein the analog form is restricted to discrete values at specific times, which specific times are related to a synchronizing event occurring in said analog form, including the steps of:

a) identifying each of said specific times in response to said synchronizing event,
b) identifying which of said discrete values said analog form is closest to at each of said specific times,
c) in response to step b), providing the digital value corresponding to said identified discrete value,
d) in response to each digital value of step c) providing said digital signal.

19. The method as claimed in claim 16, 17 or 18 wherein said digital signal is a television program consisting of audio and video portions and said analog form is one of an analog SDTV or HDTV type signal.

20. The method as claimed in claim 16, 17 or 18 wherein said digital signal is the video portion of a television program and said analog form is one of an analog SDTV or HDTV type signal.

21. The method as claimed in claim 16, 17 or 18 wherein said digital signal is an AES/EBU audio portion of a television program and said analog form is one of an analog SDTV or HDTV type signal.

22. The method as claimed in claim 16, 17 or 18 wherein in step d) error detection and correction is applied to said digital signal.

23. The method as claimed in claim 16, 17 or 18 wherein said specific times have uniform time durations.

24. The method as claimed in claim 16, 17 or 18 wherein said discrete values have uniform amplitude separation.

25. The method as claimed in claim 16, 17 or 18 wherein said specific times have non-uniform time durations.

26. The method as claimed in claim 16, 17 or 18 wherein said discrete values have non-uniform amplitude separation.

* * * * *